(12) United States Patent
Li et al.

(10) Patent No.: US 12,228,503 B2
(45) Date of Patent: *Feb. 18, 2025

(54) PHOTOTHERMAL IMAGING DEVICE AND SYSTEM

(71) Applicant: University of Notre Dame du Lac, South Bend, IN (US)

(72) Inventors: Zhongming Li, Notre Dame, IN (US); Gregory Hartland, Granger, IN (US); Masaru Ken Kuno, Notre Dame, IN (US)

(73) Assignee: University of Notre Dame du Lac, South Bend, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,245

(22) Filed: Jan. 3, 2023

(65) Prior Publication Data

US 2023/0160817 A1    May 25, 2023

Related U.S. Application Data

(63) Continuation of application No. 16/877,152, filed on May 18, 2020, now Pat. No. 11,592,391, which is a
(Continued)

(51) Int. Cl.
*G01N 21/3563* (2014.01)
*G01J 3/28* (2006.01)
(Continued)

(52) U.S. Cl.
CPC ........ *G01N 21/3563* (2013.01); *G01J 3/2823* (2013.01); *G01N 21/171* (2013.01);
(Continued)

(58) Field of Classification Search
CPC ............ G01N 21/3563; G01N 21/171; G01N 21/35; G01N 2021/1712; G01N 2021/1714; G01J 3/2823; G01Q 30/02; G01Q 60/34

See application file for complete search history.

(56) References Cited

U.S. PATENT DOCUMENTS 2,940,355 A    6/1960   Cary
5,574,562 A    11/1996  Fishman et al.
(Continued)

FOREIGN PATENT DOCUMENTS

CN    105699358 A    6/2016
DE    102014108424 B3   6/2015
(Continued)

OTHER PUBLICATIONS

Gaiduk et al., Detection limits in photothermal microscopy, 2010, Chem. Sci., 2010, Vol.1, 343-350 (Year: 2010).*
(Continued)

*Primary Examiner* — Christine S. Kim
(74) *Attorney, Agent, or Firm* — Merchant & Gould P.C.

(57) ABSTRACT

Mid-infrared photothermal heterodyne imaging (MIR-PHI) techniques described herein overcome the diffraction limit of traditional MIR imaging and uses visible photodiodes as detectors. MIR-PHI experiments are shown that achieve high sensitivity, sub-diffraction limit spatial resolution, and high acquisition speed. Sensitive, affordable, and widely applicable, photothermal imaging techniques described herein can serve as a useful imaging tool for biological systems and other submicron-scale applications.

30 Claims, 8 Drawing Sheets

Related U.S. Application Data continuation of application No. 15/480,218, filed on Apr. 5, 2017, now Pat. No. 10,677,722.

(60) Provisional application No. 62/318,698, filed on Apr. 5, 2016.

(51) Int. Cl.
    G01N 21/17      (2006.01)
    G01N 21/35      (2014.01)
    G01Q 30/02      (2010.01)
    G01Q 60/34      (2010.01)

(52) U.S. Cl.
     CPC ............. *G01N 21/35* (2013.01); *G01Q 30/02* (2013.01); *G01Q 60/34* (2013.01); *G01N 2021/1712* (2013.01); *G01N 2021/1714* (2013.01)

(56) References Cited

U.S. PATENT DOCUMENTS

| | | |
|---|---|---|
| 6,532,070 B1 | 3/2003 | Hovinen et al. |
| 7,630,081 B2 | 12/2009 | Ressler et al. |
| 7,855,780 B1 | 12/2010 | Djeu |
| 8,001,830 B2 | 8/2011 | Dazzi et al. |
| 8,242,448 B2 | 8/2012 | Prater et al. |
| 8,402,819 B2 | 3/2013 | Dazzi et al. |
| 8,607,622 B2 | 12/2013 | Dazzi et al. |
| 8,646,319 B2 | 2/2014 | Prater et al. |
| 8,680,457 B2 | 3/2014 | Maxik et al. |
| 8,793,811 B1 | 7/2014 | Prater et al. |
| 8,869,602 B2 | 10/2014 | Belkin et al. |
| 9,046,492 B1 | 6/2015 | Prater |
| 9,091,594 B2 | 7/2015 | Furstenberg et al. |
| 9,134,341 B2 | 9/2015 | Prater et al. |
| 9,250,061 B2 | 2/2016 | Lorbeer et al. |
| 9,372,154 B2 | 6/2016 | Prater |
| 9,658,247 B2 | 5/2017 | Yang et al. |
| 9,841,324 B2 | 12/2017 | Furstenberg et al. |
| 10,228,388 B2 | 3/2019 | Prater et al. |
| 10,228,389 B2 | 3/2019 | Yang et al. |
| 10,241,131 B2 | 3/2019 | Prater |
| 10,473,693 B2 | 11/2019 | Yang et al. |
| 10,677,722 B2 | 6/2020 | Li et al. |
| 10,696,405 B2 | 6/2020 | Dowty et al. |
| 10,845,248 B1 | 11/2020 | Cheng et al. |
| 10,942,116 B2 | 3/2021 | Prater et al. |
| 10,969,405 B2 | 4/2021 | Shetty et al. |
| 2002/0105641 A1 | 8/2002 | Anderson |
| 2004/0085540 A1 | 5/2004 | Lapotko et al. |
| 2004/0188602 A1* | 9/2004 | Chinn ................. G01N 21/171 850/10 |
| 2005/0105099 A1 | 5/2005 | Shpantzer et al. |
| 2008/0304046 A1 | 12/2008 | Lee et al. |
| 2009/0161092 A1 | 6/2009 | Zanni et al. |
| 2009/0236528 A1 | 9/2009 | Shpantzer et al. |
| 2009/0249521 A1 | 10/2009 | Dazzi et al. |
| 2010/0044570 A1 | 2/2010 | McGill et al. |
| 2010/0079842 A1 | 4/2010 | Dunleavy et al. |
| 2010/0315646 A1 | 12/2010 | Chism, II |
| 2010/0320171 A1 | 12/2010 | Mao et al. |
| 2011/0122488 A1 | 5/2011 | Truong et al. |
| 2011/0248166 A1 | 10/2011 | Diem et al. |
| 2012/0002030 A1 | 1/2012 | Kalkbrenner et al. |
| 2012/0026485 A1 | 2/2012 | Couston et al. |
| 2012/0122084 A1 | 5/2012 | Wagner et al. |
| 2012/0167261 A1 | 6/2012 | Belkin et al. |
| 2012/0314206 A1 | 12/2012 | Spizig et al. |
| 2013/0134310 A1 | 5/2013 | Furstenberg et al. |
| 2013/0162994 A1 | 6/2013 | Xie et al. |
| 2014/0009808 A1 | 1/2014 | Wang et al. |
| 2014/0289912 A1 | 9/2014 | Andreev |
| 2014/0361150 A1 | 12/2014 | Cheng et al. |
| 2015/0085098 A1 | 3/2015 | Dowaki et al. |
| 2015/0219684 A1 | 8/2015 | Humphris et al. |
| 2015/0285836 A1 | 10/2015 | Humphris et al. |
| 2015/0308947 A1 | 10/2015 | Xu et al. |
| 2016/0011049 A1 | 1/2016 | Furstenberg et al. |
| 2016/0161245 A1 | 6/2016 | Fu et al. |
| 2017/0127983 A1 | 5/2017 | Spegazzini et al. |
| 2017/0146455 A1 | 5/2017 | Mantele et al. |
| 2018/0007343 A1 | 1/2018 | Send et al. |
| 2018/0052186 A1 | 2/2018 | Su et al. |
| 2018/0088041 A1 | 3/2018 | Zhang et al. |
| 2018/0156674 A1 | 6/2018 | Fleming et al. |
| 2018/0180642 A1 | 6/2018 | Shetty et al. |
| 2018/0246032 A1 | 8/2018 | Li et al. |
| 2018/0259553 A1 | 9/2018 | Yang et al. |
| 2018/0364158 A1 | 12/2018 | Wang et al. |
| 2019/0120753 A1 | 4/2019 | Prater et al. |
| 2019/0204230 A1 | 7/2019 | Ota |
| 2019/0317012 A1 | 10/2019 | Furstenberg et al. |
| 2020/0025677 A1 | 1/2020 | Prater et al. |
| 2020/0217643 A1 | 7/2020 | Schnell et al. |
| 2020/0378829 A1 | 12/2020 | Decker et al. |

FOREIGN PATENT DOCUMENTS

| | | |
|---|---|---|
| WO | 2013/078471 A1 | 5/2013 |
| WO | 2018/102467 A1 | 6/2018 |

OTHER PUBLICATIONS

Article "Photothermal Lens Technique—Theory and Instrumentation," Swofford, 2015, 42 pages.

Bialkowski, "Application of the BaTiO3 Beam-Fanning Optical Limiter as an Adaptive Spatial Filter for Signal Enhancement in Pulsed Infrared Laser-Excited Photothermal Spectroscopy," Optics Letters, Sep. 1989, 3 pages.

Bialkowski, "Pulsed-Laser Excited Differential Photothermal Deflection Spectroscopy," Society for Applied Spectroscopy, 1992, 11 pages.

Bialkowski, "Ultrasensitive Photothermal Deflection Spectrometry Using an Analyzer Etalon," American Chemical Society, 1988, 6 pages.

Boyer et al., "Photothermal Imaging of Nanometer-Sized Metal Particles Among Scatters," Science, vol. 297, Aug. 2002, 4 pages.

Brandstetter et al., "High Power Terahertz Quantum Cascade Lasers with Symmetric Wafer Bonded Active Regions," Applied Physics Letters 103, 171113 (2013), 6 pages.

Burghoff et al., "Terahertz Laser Frequency Combs," Nature Photonics, 2014, 10 pages.

Cariou et al., "Refractive-Index Variations with Temperature of PMMA and Polycarbonate," Applied Optics vol. 25, No. 3, 1986.

Dowrey et al., Industrial Applications of Near-IR Imaging, Spectrochemical Analysis Using Infrared Multichannel Detectors, Blackwell Publishing, 2005, pp. 175-188.

Fournier et al., "Tomographic Approach for Photothermal Imaging Using the Mirage Effect," Journal of Physique Colloques, 1983, pp. C6-479-C6-482.

Article "Helium-Neon Laser," University of New Mexico, dated Nov. 22, 2012 (Retrieved on May 4, 2018), 6 pages.

Furstenberg et al., "Chemical Imaging Using Infrared Photo-Thermal Microspectroscopy," U.S. Naval Research Laboratory, 2012, 10 pages.

Gaiduk et al., "Room-Temperature Detection of a Single Molecule's Absorption by Photothermal Contrast," Science, 2010, 4 pages.

Gorgulu et al. "All-Silicon Ultra-Broadband Infrared Light Absorbers," Scientific Reports, 2016, 7 pages.

Grodecki et al., "Optical Absorption and Raman Scattering Studies of Few-Layer Epitaxial Graphene Grown on 4H-SiC Substrates," Acta Phys. Pol. A 116.5 (2009); 835-837 (Year 2009).

Harada et al., "Photothermal Microscopy with Excitation and Probe Beams Coaxial Under the Microscope and Its Application to Microparticle Analysis," 1993, 2938-2940.

Harthcock et al., Applications of Transmittance and Reflectance Micro/FT-IR to Polymeric Materials, Analytical Services, vol. 40, Issue 2, 1986, pp. 210-214.

(56) References Cited

OTHER PUBLICATIONS

Harthcock et al., Imaging with Functional Group Maps Using Infrared Microspectroscopy, Analytical and Engineering Sciences, vol. 42, Issue 3, 1988, pp. 449-455.
Hemming et al., "A High Power Mid-IR ZGP Ring OPO," with over 30 W of optical power (DOI: 10.1364/CLEO_SI.2013.CW1B.7), Jun. 14, 2013.
Inoue et al., "Realization of Dynamic Thermal Emission Control," Kyoto University, Jul. 2014, pp. 928-931.
Jiang et al., "Compact High Power Mid-Infrared Optical Parametric Oscillator Pumped by a Gain-Switched Fiber Laser with Figure-of-h Pulse Shape," Optical Society of America, 2015, 6 pages.
Jiang et al., "Narrow-Linewidth Megahertz-Repetition-Rate Optical Parametric Oscillator for High-Speed Flow and Combustion Diagnostics", Applied Optics, vol. 47, No. 1, 2008, pp. 64-71.
Jung et al., "Infrared Broadband Metasurface Absorber for Reducing the Thermal Mass of a Microbolometer," Scientific Reports, 2017, 8 pages.
Kluk et al., "A High-Bandwidth, High-Precision, Two-Axis Steering Mirror with Moving Iron Actuator," Mechanical Engineering Department, Massachusetts Institute of Technology, 2010, pp. 552-557.
Lasne et al., "Label-Free Optical Imaging of Mitochondria in Live Cells," Optical Society of America, 2007, 10 pages.
Li et al., "Mid-Infrared Photothermal Imaging of Active Pharmaceutical Ingredients at Submicrometer Spatial Resolution," Anal. Chem., 89, 2017, 4863-4867.
Li et al., "Super-Resolution Imaging with Mid-IR Photothermal Microscopy on the Single Particle Level," SPIE Proceedings vol. 9549, 954912-18, 2015, 8 pages.
Li et al., "Super-Resolution Far-Field Infrared Imaging by Photothermal Heterodyne Imaging," The Journal of Physical Chemistry B, 2017, 8838-8846.
Li et al., "Super-Resolution Mid-Infrared Imaging Using Photothermal Microscopy," Conference on Lasers and Electro-Optics, Optical Society of America, San Jose, California, 2016, p. ATu3J7.
Liu, "Differential Interference Contrast-Photothermal Microscopy in Nanospace: Impacts of Systematic Parameters," Journal of Microscopy, Mar. 2017, 9 pages.
Marcott et al., "Mining the Information Content Buried in Infrared and Near-Infrared Band Shapes by Temporal, Spatial, and Other Perturbations," Applied Spectroscopy, 2009, 9 pages.
Mertiri et al., "Label Free Mid-IR Photothermal Imaging of Bird Brain with Quantum Cascade Laser," CLEO: Applications and Technology, Optical Society of America, 2014, p. AF1B 4.
Mertiri et al., "Nonlinear Midinfrared Photothermal Spectroscopy Using Zharov Splitting and Quantum Cascade Lasers," ACS Photonics, 2015, 7 pages.
Mertiri et al., "Mid-Infrared Photothermal Heterodyne Spectroscopy in a Liquid Crystal Using a Quantum Cascasde Laser," Applied Physics Letters, 101, 2012, 4 pages.
Moscatelli, "Tiny Lenses for Miniature Devices," Scientific American, Dec. 2019, 1 page.
Peng et al., High-Power Mid-Infrared Tunable Optical Parametric Oscillator Based on 3-mm-Thick PPMgCLN1, Institute of Applied Electronics, China Academy of Engineering Physics, 2012, pp. 87-90.
Sander, "Mid-Infrared Photothermal Imaging," Laser Science, Optical Society of America, 2015, p. LMII.
Selmke et al., "Photothermal Single Particle Microscopy: Detection of a Nanolens," ACS Nano, 2011, 11 pages.
Stolyarov et al., "Photothermal Speckle Modulation for Noncontact Materials Characterization," Opt. Lett., 40, 24, 2015, 5786-5789.
Sullenberger et al., "Spatially-Resolved Individual Particle Spectroscopy Using Photothermal Modulation of Mie Scattering," Massachusetts Institute of Technology, vol. 42, No. 2, Jan. 15, 2017, pp. 203-206.
Tapos et al., "High Bandwidth Fast Steering Mirror," Optomechanics, 2005, 14 pages.
Wang et al., "High-Power Terahertz Quantum Cascade Lasers with ~0.23 W in Continuous Wave Mode," AIP Advances, 2016, 6 pages.
Webpage—Optotronics—https://www.optotronics.com/532nm-green-laser-systems.php, 2017, 2 pages.
Winefordner et al., "Comparison of Calculated Detection Limits in Molecular Absorption, Molecular Luminescence, Raman, Molecular Ionization, and Photothermal Spectroscopy," Applied Spectroscopy, vol. 39, No. 3, 1985, 15 pages.
Zanuto, "Analysis of the Thermo-Reflectivity Coefficient Influence Using Photothermal Pump-Probe Techniques," Applied Spectroscopoy, 2016, 7 pages.
Zhao, "Heterogeneous and Cross-Distributed Metal Structure Hybridized with Mos2 as High-Performance Flexible SERS Substrate," School of Physics and Electronics, Sep. 2018, 13 pages.
Callaway, "It Opens up a Whole New Universe: Revolutionary Microscopy Technique See Individual Atoms for First Time," Nature, vol. 582, Jun. 11, 2020, 2 pages.
Cho Pak et al., "Investigation of Standoff Explosives Detection Via Photothermal/Photoacoustic Interferometry," Chemical, Biological, Radiological, Nuclear, and Explosives Sensing XII, vol. 8018, No. 1, May 13, 2011, 15 pages.
Totachawattana et al. "Optimization of Mid-IR Photothermal Imaging for Tissue Analysis," Visual Communications and Image Processing, Aug. 26, 2015, 7 pages.
Nedosekin et al., "Photothermal Confocal Spectromicroscopy of Multiple Cellular Chromophores and Fluorophores," Biophysical Journal, Feb. 1, 2012, 10 pages.
Zhang et al., "Depth-Resolved Mid-Infrared Photothermal Imaging of Living Cells and Organisms with Submicrometer Spatial Resolution," Science Advances, Sep. 28, 2016, 8 pages.
Application and file history for U.S. Appl. No. 14/748,430, filed Jun. 24, 2015. Inventors: Furstenberg et al.
Application and file history for U.S. Appl. No. 16/427,866, filed May 31, 2019. Inventors: Decker et al.
Application and file history for U.S. Appl. No. 15/715,534, filed Sep. 26, 2017. Inventors: Zhang et al.
Application and file history for U.S. Appl. No. 15/826,147, filed Nov. 29, 2017. Inventors: Shetty et al.
Application and file history for U.S. Appl. No. 16/155,089, filed Oct. 9, 2018. Inventors: Prater et al.
Application and file history for U.S. Appl. No. 16/702,094, filed Dec. 3, 2019. Inventors: Prater et al.
Application and file history for U.S. Appl. No. 15/480,218, filed Apr. 5, 2017. Inventors: Li et al.
Application and file history for U.S. Appl. No. 16/877,152, filed May 18, 2020. Inventors: Li et al.

* cited by examiner

PHOTOTHERMAL IMAGING DEVICE AND SYSTEM

CROSS REFERENCE TO RELATED APPLICATION

This application is a continuing application from U.S. patent application Ser. No. 16/877,152, filed on May 18, 2020, which is a continuation application of U.S. patent application Ser. No. 15/480,218, filed Apr. 5, 2017, now U.S. Pat. Nos. 10,677,722, which claims priority from U.S. Provisional Application Ser. No. 62/318,698, filed Apr. 5, 2016, entitled "SUPER-RESOLUTION MID-INFRARED PHOTOTHERMAL IMAGING" and incorporated herein by reference in its entirety.

GOVERNMENT LICENSE RIGHTS

This invention was made with government support under Grant No. CHE 1110560 awarded by the National Science Foundation (NSF), Grant No. N00014-12-1-0130 awarded by the Office of Naval Research (ONR), and Grant No. W911NF-14-1-0604 awarded by the U.S. Army Research Office. The government has certain rights in the invention.

FIELD OF THE DISCLOSURE

The present disclosure relates generally to mid-infrared imaging. More specifically, the present disclosure relates to imaging structures and objects with a sub-micron spatial resolution using mid-infrared light.

BACKGROUND OF RELATED ART

Mid-infrared (mid-IR or MIR, $\lambda$=3-25 µm) light has been used as an imaging technique for a variety of applications, including medical diagnosis, night vision, and remote sensing. Mid-IR imaging provides some advantages over other IR, visible, and/or ultra-violet (UV) light-based imaging. Many substances absorb mid-IR light and cause resonant vibrational excitations of chemical bonds, which makes it a nearly universal label-free tool applicable to almost any material. Additionally, different compounds exhibit unique absorption features in the mid-IR spectrum, enabling mid-IR light to be used in spectroscopic applications. Mid-IR spectroscopy can be used to identify and characterize the chemical composition of objects. Additionally, mid-IR spectroscopy can be used to track activity of biological systems.

Mid-IR light also experiences significantly less scattering than visible or UV light, allowing it to penetrate much farther into scattering materials. Such reduced scattering can be useful when conducting measurements over a long distance, such as in gas sensing and remote sensing. Additionally, since any object that emits heat—at least above the temperature of absolute zero—radiates infrared light, mid-IR imaging can also be achieved without a separate illumination source. The object being imaged can itself serve as a light source and thus enable "passive-detection." Further, since the photon energy of MIR radiation is relatively low, no photochemical reactions are stimulated, allowing mid-IR imaging to be non-disruptive. Other biological system imaging techniques, such as fluorescence imaging, suffer from photo-bleaching and phototoxicity effects.

Although mid-IR imaging can be a powerful tool, there are some drawbacks inherent to the physical nature of mid-IR light and mid-IR devices. One difficulty in mid-IR imaging is the scarcity of the infrared detectors. There are two major types of infrared detectors: thermal detectors and photonic detectors. Thermal detectors are typically affordable, but slow and sometimes inaccurate. Photonic detectors, on the other hand, have better read out speed and accuracy compared to thermal detectors, but are usually expensive and require an extremely low temperature to function (e.g. −203° C.). Commonly used indium antimonide (InSb) or mercury cadmium telluride (MCT) detectors usually requires a liquid nitrogen ($LN_2$) or thermoelectric (TE) cooling system, which make them inconvenient to use and economically undesired.

Typical mid-infrared imaging techniques also tend to have limited spatial resolution, due to the Abbe diffraction limit. The spatial resolution of a specific color of light is linearly dependent on its wavelength, such that longer wavelengths lead to lower spatial resolution. Mid-IR light includes wavelengths from 3 to 25 µm, while visible light spans from 390 nm to 700 nm. This means that, in typical imaging systems, the spatial resolution achievable from mid-IR light can be anywhere from 5 to 65 times lower than that of visible light. This means that for biological systems, conventional MIR imaging typically provides access to spatial information down to the tissue level. One important application at this level known as "thermography" can be used, for example, as a diagnosis tool for early breast cancer detection. However, analysis of nano-scale structures is usually not possible with conventional MIR techniques. Due to these physical limitations, imaging submicron-sized objects using mid-IR light has been infeasible in existing imaging systems.

The apparent problem of low resolution in mid-IR imaging has been approached using different technologies, such as Scanning Probe Microscopy (SPM), solid-immersion lens, scattering-type scanning near-field optical microscopes (s-SNOM, a technique that utilizes a metalized atomic force microscope tip to scatter broadband infrared radiation), and others. However, those methods rely heavily on integration of sophisticated instruments and they deprive MIR measurement of its potential to be performed in media. At the same time, the cumbersome (cooling needed), expensive and less reliable MIR detectors are in the standard configuration of those methods.

Additionally, Fourier transform spectroscopy of the scattered light gives information about molecular vibrations with a spatial resolution as high as 20 nm. Another alternative form of SPM integration with MIR imaging relies on photothermal induced resonance effects. In this method, pulsed MIR light is used in total internal reflection with a ZnSe crystal. Absorption of the MIR light by the material in contact with the prism causes thermal mechanical expansion, which is detected by the SPM tip. Scanning the tip over the sample yields super-resolved MIR images. Also, in order to tackle the limited resolution, solid immersion lens is a viable approach too. MIR radiation is focused by the solid immersion lens into a material with a high refractive index, which thereby results in a reduced focal spot by a factor of the refractive index, comparing to that in vacuum. The evanescent wave escapes from the high refractive index material into the air, and hence probes the sample on the surface in a near field mode.

Although advances have been made with the methods described above, those techniques rely heavily upon the integration of sophisticated instrumentations, which results in complex experimental setups. Also, none of the approaches above overcomes the difficulty of detector sensitivity. A traditional expensive $LN_2$- or TE-cooled detector is used within the standard configuration of those experimental setups. Thus, a method that not only improves the spatial resolution of MIR imaging, but also circumvents the usage of a standard MIR detector, is desired.

It is accordingly an objective of the present invention to provide mid-IR imaging systems and methods—which utilize the spectroscopic benefits of mid-IR—while also improving upon the spatial resolution limitations inherent in typical mid-IR imaging systems.

DETAILED DESCRIPTION

Figure 1:
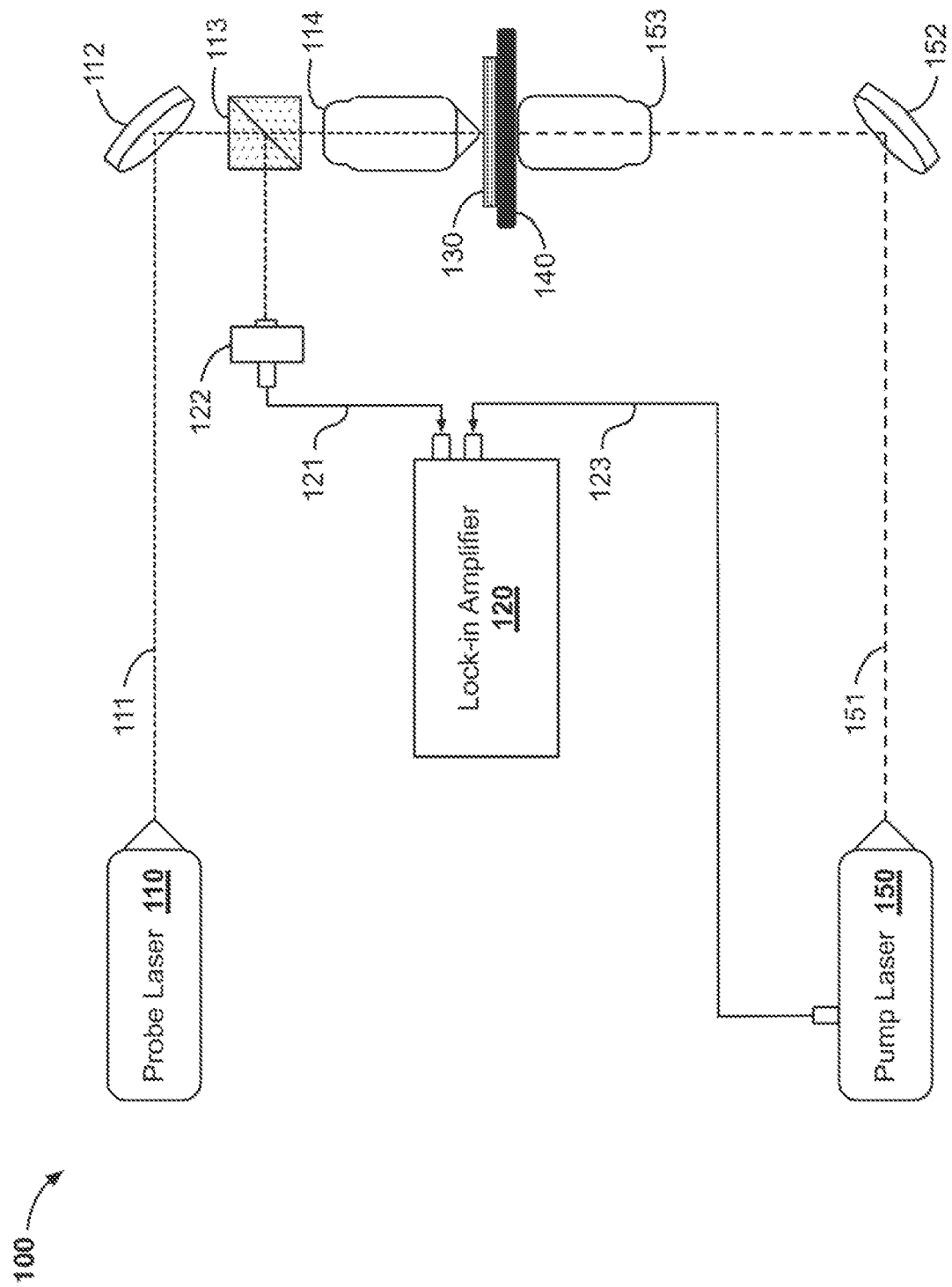
FIG. 1 is a schematic diagram of an example photothermal imaging system, according to an example embodiment.

The following description of example methods and apparatus is not intended to limit the scope of the description to the precise form or forms detailed herein. Instead the following description is intended to be illustrative so that others may follow its teachings.

Mid-infrared radiation is resonant to the vibrational excitations of many chemical bonds and can, therefore, its absorption spectra reveal a wealth of information of molecular composition. When MIR spectroscopy is performed in a localized area, identifying, characterizing and tracking microscopic objects become accessible. Databases of MIR spectra enable analysis of complex structures, such as single live cells and individual protein complexes. Since MIR spectroscopy reflects the vibrations of chemical bonds, the unique combination of different chemical bonds in a molecule gives rise to a characteristic spectral "fingerprint." This circumvents the common procedures of applying stains, fixatives, or exogenous fluorophores for imaging biological samples.

Although MIR spectroscopy is a powerful tool, there are two major inherent drawbacks. First, MIR imaging typically has a limited spatial resolution. According to Abbe diffraction, the minimum spatial resolution that can be achieved is $$\text{resolution} = \frac{\lambda}{2*NA} \qquad (1)$$

where $\lambda$ denotes the wavelength of light and NA denotes the numerical aperture of the objective. Thus, MIR radiation typically has a spatial resolution that is around an order-of-magnitude worse than visible light, given the same or similar optics conditions.

In order to solve the problems described above, a technique that uses an affordable and reliable detector and has a superior spatial resolution is needed. Mid-infrared photothermal heterodyne imaging (MIR-PHI) systems overcome the diffraction limit of traditional MIR imaging. Photothermal imaging systems of the present application utilize a combination of a mid-IR "pump" laser and a visible light "probe" laser. Under one theory of operation, irradiating a sample with the pump laser may heat the sample and its surrounding medium, which can cause a thermal "lens" to form.

The photothermal effect is the phenomenon that, when an object absorbs photons, it can release the energy through radiating heat to its surrounding medium. This forms a temperature gradient in the medium around the object. Then by using a separate probe light source with a much shorter wavelength than the MIR wavelengths (i.e., at a visible or near-IR wavelengths), the MIR-PHI can measure mid-IR absorption of the sample with a spatial resolution well below the Abbe diffraction limit of the mid-IR pump beam. The use of visible or near-IR wavelength for the probe beam enables use of visible/near IR photodiodes as detectors disclosed herein that may accomplish using reliable and cost-effective detectors with higher sensitivity than mid-IR detectors. Since the refractive index of the medium is related to its temperature, the temperature gradient creates a refractive index gradient which resembles a lens. This thermal lens can then affect the propagation of a probe beam and thus generate a photothermal signal. Raster scanning in two dimensions—using a movable platform such as a piezo stage—can create a contrast between the presence and absence of the thermal lens, thereby forming a photothermal image.

According to one embodiment, a pump beam is at least partially absorbed by an analyte or sample, which gives rise to localized heating. The heating effect can cause the refractive index of the particle and its surrounding environment to change, creating a refractive index gradient. This refractive index gradient in the medium behaves in a similar way as a lens, and is referred to as a "thermal lens." The probe beam—which is preferably non-resonant to the analyte's absorption—is then used to detect the thermal lens effect. A shorter wavelength probe can be utilized, so that the Abbe diffraction resolution is much improved. In some embodiments the probe wavelength can be selected in the visible region, where reliable, sensitive and affordable detectors are readily available. Furthermore, the power of the probe can be operated at a higher power levels, in order to minimize the photon noise, as long as the power level is below the sample damage threshold.

Photothermal imaging offer several advantages that solve the problems associated with conventional mid-IR imaging. For the scarcity of detector issue, since the photothermal effect a visible or near-infrared light source, such as a visible or near IR laser can be used as the probe. Detectors for visible or near-infrared light can be faster, cheaper and more sensitive. Also, the spatial resolution of photothermal imaging is determined by the probe wavelength (not the wavelength of the mid-IR heating beam), which implies a significant improvement over the spatial resolution of conventional mid-IR imaging. This can be very useful in many applications, for instance in the medical imaging field, because it can potentially push the limit of mid-IR imaging to a subcellular level or even smaller, while the commonly used scale right now is at the level of imaging tissues. On the other hand, using a mid-IR pump beam in the photothermal technique also remedies one of the shortcomings of conventional photothermal imaging measurements. Since the photothermal effect is based on the absorption of photons, the conventional photothermal imaging measurements using visible or near-IR pump lasers are limited to studying materials such as noble metal nanoparticles and dye molecules that absorb in the visible region. Since almost all compounds absorb mid-IR light and then generate thermal energy, the applicability of photothermal imaging is vastly broadened by the introduction of the mid-IR technique.

In this disclosure, PHI experiments are described that utilize a mid-IR pump laser source. It is shown that MIR-PHI imaging systems can achieve micrometer spatial resolution, which is much smaller than the diffraction limit of the mid-IR light source. The combination of mid-IR and photothermal imaging techniques exploits affords the benefits of improved spatial resolution with robust and inexpensive detectors, while also maintaining the spectroscopic potential associated with mid-IR absorption.

In summary, MIR-PHI systems overcome the diffraction limit typically inherent to MIR imaging, while using fast and accurate visible/near IR photo detectors. With our counter-propagating geometry, it is possible to obtain high contrast images of 1.1 µm polystyrene beads in glycerin and in air. Clear absorption spectra were also acquired locally on the single particles. These improvements to mid-IR imaging have the potential to provide opportunities for researchers to investigate biological systems in media on a spatial scale that was not previously achievable, and thus has broad application potential in biological imaging.

FIG. 1 is a schematic diagram of an example photothermal imaging system 100. In photothermal imaging system 100, a probe laser 110 emits a probe beam 111 toward a probe mirror 112, which reflects the probe beam 111 onto beam splitter 113. Beam splitter 113 may be a polarizing beamsplitter or similar to allow the probe beam 111 reflecting off the probe mirror 112 to pass through to the objective 114 and onto a first side of sample 130. In some implementations, the probe beam 111 is a visible light laser beam, and/or a near IR laser beam.

The pump laser 150 emits a pump beam 151 toward a pump mirror 152, which reflects pump beam 151 toward a reflective objective 153 The reflective objective 153 may serve to irradiate the sample 130 from a second side, which is opposite to the first side. This arrangement—in which the probe beam 111 and pump beam 151 illuminate or irradiate the sample 130 from opposite sides—may be referred to herein as a "counter propagating geometry." In some implementations, the pump beam 151 may be a mid-IR laser beam.

During operation, the pump beam 151 irradiates the sample 130, which absorbs the mid-IR light, causing localized heating on the sample 130. This localized heating can lead to the thermal lens effect described herein. The probe beam 111 incident on the sample 130 interacts with a region of the sample illuminated by the pump beam. which scatters some of the light of probe beam 111, for example due to the thermal lens temperature gradient of an absorbing region of the sample Some of the reflected probe beam 111 then travels back toward the beam splitter 113, which directs the reflected probe beam 111 toward a photodiode 122. The photodiode 122 then collects and measures the probe beam light 111, which may be stored on a computing device or the like.

The step of mid-IR irradiation, and probe beam reflection measurement by the photodiode 122 may be repeated at different locations on sample 130. Movable platform 140—which may be a base controlled by servos, a piezo stage, or other actuating platform—may move the sample 130 laterally or longitudinally (with respect to the objective 114) in order to position objective 114 and reflective objective 153 over a different location on sample 130. That new location may then be irradiated by the mid-IR pump beam 151, and measured by the reflected probe beam 111 incident on photodiode 122. By repeating this step at various locations of the sample 130 and storing the read out values from photodiode 122, a computing device may then construct a 2D image representing the photothermal intensities of the sample.

The photodiode 122 may provide a probe signal input indicative of the intensity of the reflected probe beam 111 to a lock-in amplifier 120. The lock-in amplifier 120 may be configured on the basis of the wavelength of the probe beam 111 (i.e., referenced to the modulation frequency of the pump beam) and may be capable of detecting minor fluctuations in the properties of the probe beam 111 caused by the thermal lens effect of the sample 130. The lock-in amplifier 120 may also receive a pump beam modulation signal 123 from the pump laser 150 indicative of the modulation frequency of the pump beam 151 (e.g., 100 kHz, 150 kHz, etc.). In some implementations, the lock-in amplifier 120 also receives a signal from the probe laser 110 indicative of the frequency or wavelength of the probe beam 111.

An example MIR-PHI system (such as the photothermal imaging system 100 shown in FIG. 1) comprises two laser sources. A tunable MIR pump laser 150 (e.g., with wavelengths between 2.5-3.7 µm), operating under pulse mode at 150 kHz, is used as the pump laser source. This range covers the C—H, N—H, and O—H stretch absorption peaks, which are present in organic compounds. A tunable pump light source enables the measurement to be made a multiple mid-IR wavelengths, thereby allowing for data to be taken that is representative of an IR absorption spectrum at sub-micron spatial resolution. For some of the experiments described below, the pump laser is tuned to 3030 cm$^{-1}$ to excite 1.1 µm polystyrene beads. A counter-propagating, continuous wave (CW) 532 nm probe laser 110 is used to detect the thermal lens created by the pump laser 150. The pump laser 150 is focused by a reflective objective 153 (NA=0.65), and the probe beam 111 is focused by a long working distance, high NA glass objective 114 (NA=0.80). This arrangement is different to that used in previous MIR-PHI measurements, where a single reflective objective was used to focus the pump and the probe at the sample. The advantage of this setup is that a tighter focus can be obtained for the probe beam 111, yielding higher spatial resolution. A disadvantage is that two counter-propagating beams have to be carefully aligned with each other to maximized the PHI signal. The reflected probe beam is detected by a Si-photodiode, and the signal from the Si-photodiode is sent to a lock-in amplifier (e.g., a Stanford Research SR-844 RF Lock-in Amplifier), which is triggered by pulses from the MIR laser at 150 kHz. Raster scanning with a piezo stage 140 across an area on the order of 10×10 µm therefore results in a MIR-PHI image.

In terms of the sample preparation procedure, an optical cell with high mid-infrared transmission (e.g., two sapphire windows) can be used. Specimens are applied on a surface of one of the sapphire windows by drop-casting or spin-coating. A small amount of medium can be dropped onto the specimen. Parafilm or a sealant can then be used to seal the peripheral areas of the two windows together, and thus create an optical cell with a thin chamber of the specimen surrounded by the solvent. The thickness of the sapphire window was selected to be small, so that it will be within the working distance of the objective.

The probe beam 111, which can be a visible or near-infrared laser, may be operated in the continuous wave (CW) mode. In one embodiment, the two lasers may be designed to be counter-propagating whereby the sample is illuminated from different sides by the two lasers. This design avoids the usage of dichroic mirrors for combining the mid-IR and visible light, which may be desirable due to the dichroic mirrors for these two laser wavelengths vastly attenuating the intensity of the mid-IR beam. This arrangement also allows the use of high magnification microscope objectives for the probe beam 111 (since objectives that transmit IR light are typically low magnification).

In one embodiment, the probe beam 111 is directed at a first sample surface while the pump beam 151 is directed to a second sample surface opposite the first. In other embodiments, the surfaces illuminated by the two beams may not be exactly opposite one another. In one instance, the pump beam 151 may be directed to an adjacent surface as the one being illuminated by the probe beam 111. In another embodiment, the pump beam 151 may be directed to the same area where the surface illuminated by the probe beam 111 resides. In one embodiment, the angle of separation between the pump beam 151 and the probe beam 111 may be about 180 degrees. In other embodiments, the angle of separation may be some angle less than 180 degrees but sufficient to provide a separate pathway for the pump beam 151 and probe beam 111. The angle of separation provides two pathways, one for the probe beam 111 and one for the pump beam 151 to illuminate the same area of the sample under test.

In one embodiment, the reflected probe beam from the sample surface is then collected by the same objective used to focus it, and detected by a photo detector, which can simply be a regular visible light photodiode (e.g., Si, InGaAs, Ge, etc.). The signal from the photo detector 122 is then processed by a lock-in amplifier 120, referenced to the modulation frequency (via signal 123) of the pump beam 151. This allows the lock-in amplifier 120 to detect the amplitude and the relative phase of the photothermal signal output from the photodiode 122. A raster scan of the sample over a certain area, which can be conducted by a piezo-stage 140, then creates a mid-IR photothermal image.

Signal processing devices, such as the lock-in amplifier, may sample or measure one or more property of collected probe light (i.e., reflecting off a sample or a region of a sample). For instance, a signal processing device may—based on parameters of the photothermal imaging system (e.g., a pump beam pulse or modulation frequency, a wavelength of the pump beam, a wavelength of the probe beam, etc.)—determine a frequency, shift in frequency, phase, phase shift, intensity, or any other property of the collected probe beam light. The property or properties measured and/or determined by the signal processing device may serve as a basis for analyzing, imaging, conducting spectroscopic analysis, and/or other operations on a sample or a region of a sample.

Figure 2B:
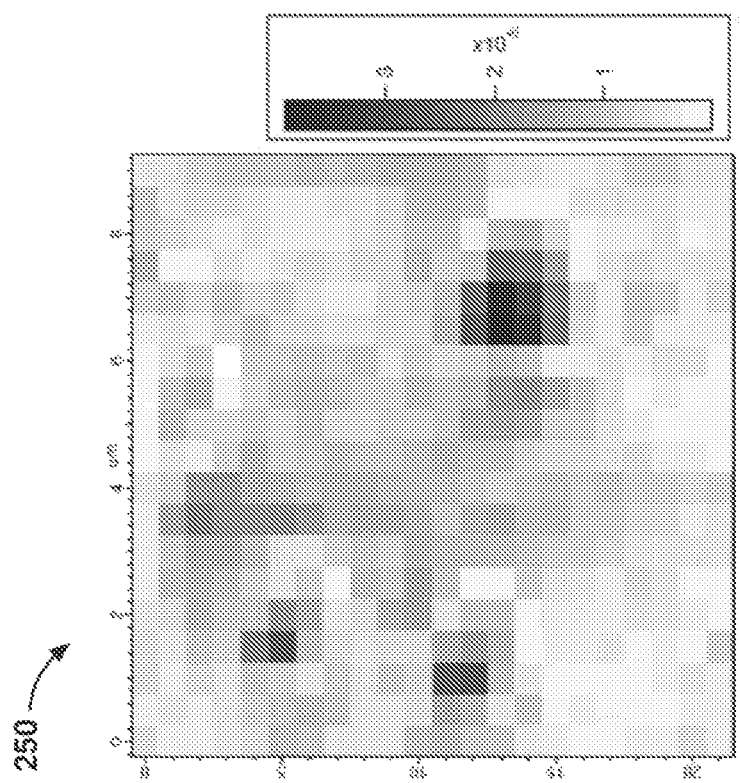
FIG. 2B is an image of polystyrene beads in water captured by the example photothermal imaging system using a mid-IR pump beam wavelength of 3300 cm$^{-1}$.
Figure 2A:
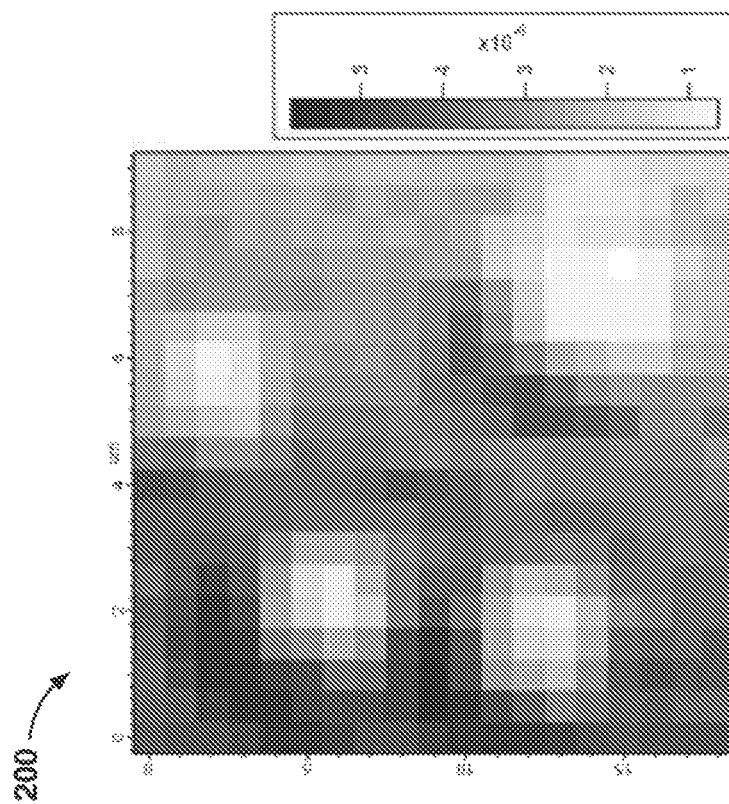
FIG. 2A is an image of polystyrene beads in water captured by the example photothermal imaging system using a mid-IR pump beam wavelength of 2850 cm$^{-1}$.

In order to obtain good imaging contrast, the selection of the mid-infrared wavelength is important. If the analyte has an absorption peak at a certain wavelength while the solvent doesn't absorb at that same wavelength, the contrast of the image will be high. This can be achieved by using solvents with limited mid-infrared absorption features, such as $CS_2$ and $CCl_4$. For water—which has a very broad absorption in the mid-IR region—two strategies can be used to obtain an image with good contrast. First, images can be captured at a wavelength where the absorption of water is limited and the absorption from the analyte is at its maximum. For example, at 2850 $cm^{-1}$, a polystyrene bead can be clearly imaged with the mid-PHI technique in water (as shown in FIG. 2A). Another method involves tuning the mid-IR wavelength to water's absorption peak while the analyte doesn't have any absorption. For example, at 3300 $cm^{-1}$, a clear image can also be collected for polystyrene beads in water (shown in FIG. 2B). The two images of the same object using these two strategies will be complementary with each other, one with a dark background and a bright signal, and the other one with a bright background and a dark signal.

The solvent used in the photothermal imaging system can also affect its performance. Some organic solvents have outstanding photothermal properties, such as $CS_2$ and $CCl_4$. Photothermal imaging with these solvents results in a very high signal-to-noise sensitivity. However, they are usually toxic, volatile, and not compatible with biological samples. Glycerin, which is biocompatible and viscous, has a relatively high photothermal performance. Water, as the ideal medium for biological samples, does not have a sensitive photothermal response compared to other solvents. However, water was used to achieve a visualization of one micron polystyrene particles in water at a single particle level using this technique. For example, 1.1 µm polystyrene beads were successfully visualized with super-resolution in water (as shown in FIG. 2A and FIG. 2B).

The selection of medium is an important factor for PHI measurements. A preferable medium for PHI includes the following characteristics. First, a large refractive index provides for better performance of the thermal lens. Second, a preferable PHI medium has a small heat capacity, with the aim to maximize the change in temperature created by a given amount of heat transferred from the particle. Additionally, the more sensitive the refractive index is to temperature, the shaper the refractive index gradient will be in the thermal lens. A figure-of-merit for the overall photothermal performance of a medium can be expressed with equation (2) below:

$$\Sigma \text{Photothermal} = n \left| \frac{\delta n}{\delta T} \right| \left( \frac{1}{C_T} \right) \quad (2)$$

where n denotes the refractive index, T denotes the temperature, and $C_T$ represents the heat capacity under temperature T. Researchers have compared the performance of different common solvents. Among them, carbon disulfide ($CS_2$) was found to have preferable photothermal properties. Additionally, carbon tetrachloride, chloroform, hexane, decane, ethanol, glycerin, and water are other solvents that exhibit preferable photothermal properties.

The thermal diffusion length is another factor that has a large impact on PHI image contrast. Since the particles are heated by the pump beam intermittently at the modulation or pulse frequency, the magnitude of the frequency is directly related to the thermal diffusion length. Lower frequencies give longer thermal diffusion lengths and yield higher photothermal signals, until the thermal diffusion length exceeds the size of the focal spot. Therefore a focal spot size that matches the thermal diffusion length will be optimal. The thermal diffusion length ($r_{th}$) of the medium can be calculated with the equation (3) below:

$$r_{th}^2 = \frac{2D_{th}}{\Omega} = \frac{2k}{C_p \Omega} \quad (3)$$

where $D_{th}$ is the thermal diffusivity, k is the thermal conductivity of the medium, $\Omega$ is the modulation frequency, and $C_p$ is the heat capacity per unit volume photothermal medium. At the same time, the lower the modulation frequency, the longer the thermal diffusion length, and the worse the spatial resolution will be. That is why we triggered our measurement at the high pulse frequency of 150 kHz, which is much higher than that in the previous literatures (20 Hz). This made sub-diffraction limit resolution (of the pump beam) practically plausible. The thermal diffusion length ($r_{th}$) of different media are calculated. Under 150 kHz of modulation, carbon disulfide ($CS_2$) has a diffusion length of 1.3 μm, that of glycerin is 1.2 μm, and that of water is 1.3 μm. A 532 nm probe laser, the size of the focal spot is estimated to be about 0.9 μm for the 0.8 NA objective used in our experiments, which roughly matches the thermal diffusion lengths of different media.

In a MIR-PHI setup, a MIR laser is used as a pump beam to create absorption events on sample objects. A temperature gradient is thereby created around the heated particles. Since the refractive index of the medium is directly related to its temperature, a temperature gradient will result in a refractive index gradient, which can then be detected by another probe beam. The information of the absorption event is therefore measured indirectly by the change in the probe light. Since the light being measured is the probe (usually visible light), it is no longer constrained by the Abbe diffraction limit of the MIR, and only detectors for visible light are needed.

The integration time on the lock-in of the lock-in amplifier 120 is an important factor in system performance as well. Generally, the longer the integration time, the better the signal-to-noise for the PHI signal. However, extended lock-in integration time substantially deteriorates MIR-PHI's real-time detection capability. In experiments described herein, 300 ms is used under $CS_2$ medium, and 1 second is used for glycerin and water.

FIGS. 2A and 2B are images of polystyrene beads in water captured by the example photothermal imaging system using a 532 nm probe laser. In image 200, the mid-IR pump beam is configured to operate at a wavelength of 2850 cm$^{-1}$. In image 250, the mid-IR pump beam is configured to operate at a wavelength of 3300 cm$^{-1}$.

These two wavelengths were selected to form the largest contrast between two materials. At 3300 cm$^{-1}$, water has a high absorption strength, while the absorption from polystyrene should be low. On the other hand, at 2850 cm$^{-1}$, polystyrene has a local maxima in its mid-IR absorption spectra, while the absorption from water falls to around 20%. Hence, the two chosen wavelengths 3300 cm$^{-1}$ and 2850 cm$^{-1}$ should form complementary images with relatively high contrasts.

The results, as shown in FIGS. 2A and 2B, confirmed the above prediction. In FIG. 2A, the polystyrene beads appear to have a negative photothermal signal (lower than the background). In contrast, in FIG. 2B, the polystyrene beads appear positive (higher than the background). The S/N ratio measured at 3300 cm$^{-1}$ is 4, while at 2850 cm$^{-1}$ it becomes around 11.

Post-processing of the resulting images can be done to improve the S/N level. For example, image fusion can be a viable method to enhance image contrast. However, in this example, a specific algorithm could be used to properly combine the two images, in order to retain the appropriate chemical information.

Figure 3B:
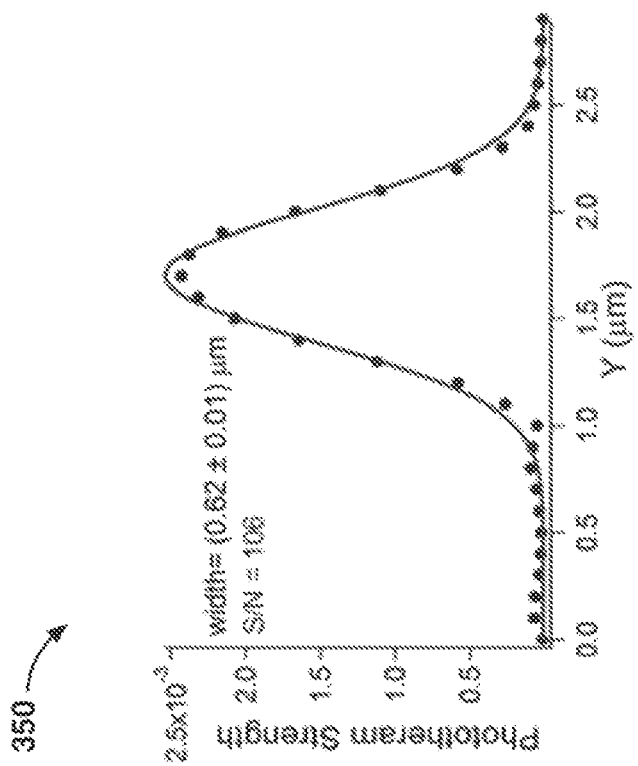
FIG. 3B is a line-profile of the MIR-PHI image of FIG. 3A across the polystyrene bead.
Figure 3A:
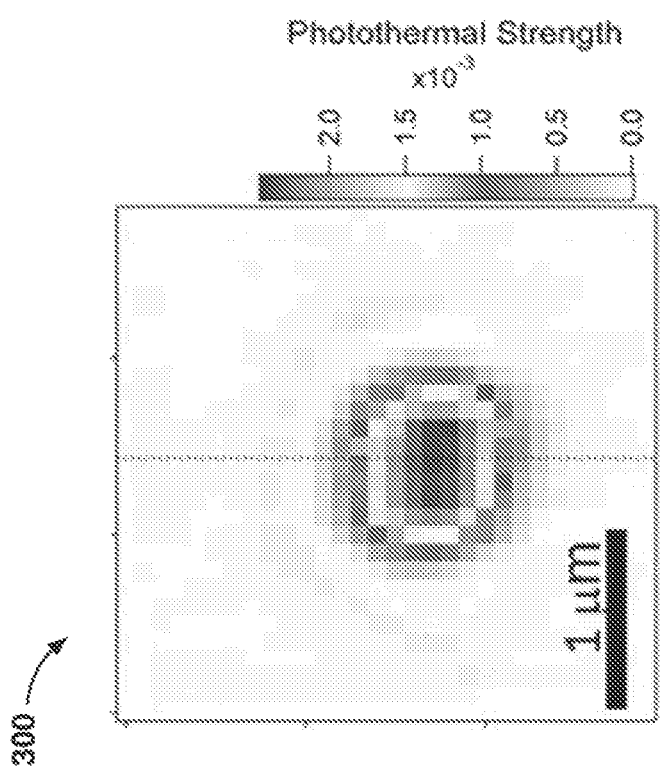
FIG. 3A is a MIR-PHI image of a polystyrene bead in glycerin captured by the example photothermal imaging system.

FIG. 3A is a MIR-PHI image 300 of a polystyrene bead in glycerin captured by the example photothermal imaging system. As shown in FIG. 3A, when a polystyrene bead is placed in glycerin, strong MIR-PHI signal was obtained (S/N>100) within a short acquisition time. By fitting the signal intensity profile into a Gaussian beam profile, a Gaussian beam waist of 0.62 μm±0.01 μm was measured, which is much smaller than the Abbe diffraction limit of the MIR light (around 2.33 μm). Thus, super-resolution was experimentally achieved.

FIG. 3B is a line-profile graph 350 of the MIR-PHI image of FIG. 3A across the polystyrene bead. The line-profile graph 350 may be used to calculate performance factors, such as signal-to-noise ratio (SNR). As shown in FIG. 3B, the photothermal imaging system achieved an SNR of 106, with a Gaussian beam waist of approximately 0.62 μm, for a polystyrene bead in glycerin. This image demonstrates for example the ability MIR-PHI embodiments described in this disclosure to achieve spatially resolved measurements of IR absorption with sub-micron spatial resolution.

Figure 4:
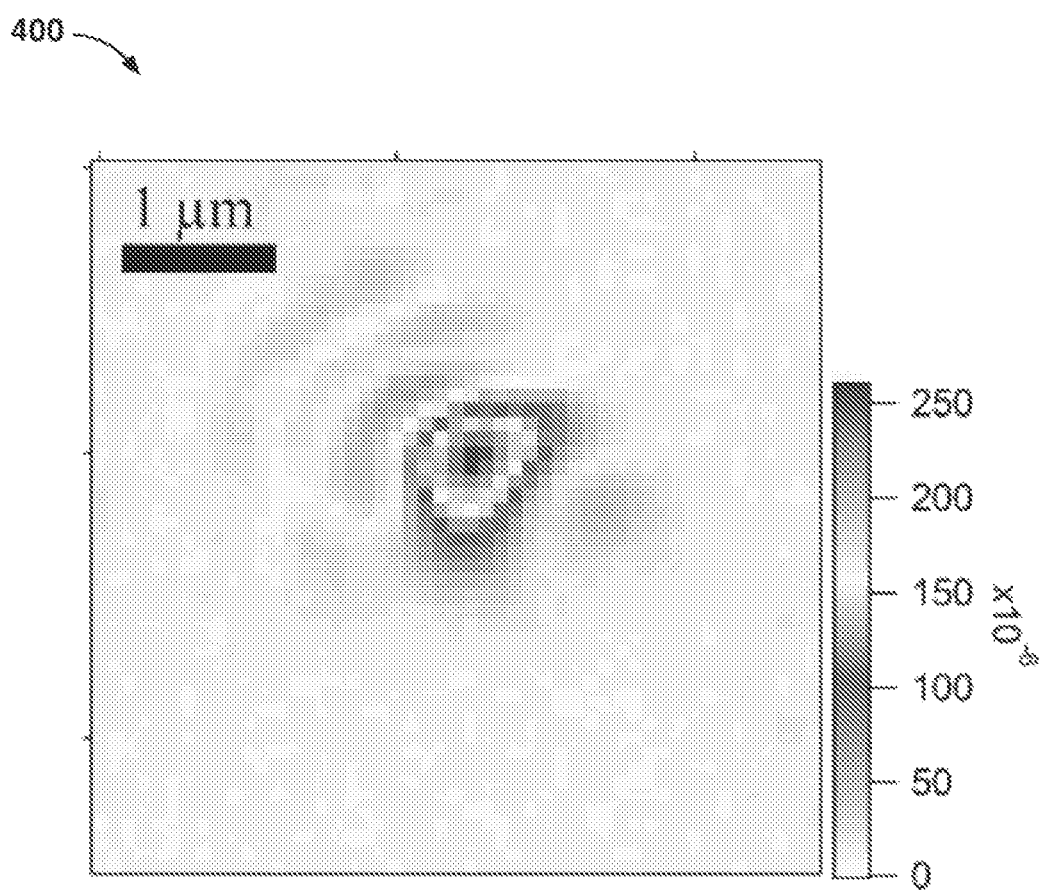
FIG. 4 is an image of polystyrene beads in air on a glass coverslip captured by the example photothermal imaging system.

FIG. 4 is an image 400 of polystyrene beads in air on a glass coverslip captured by the example photothermal imaging system. In FIG. 4, bare polystyrene beads were not immersed in any liquid media, but simply drop-cast on a glass coverslip. While maintaining at a high contrast, the shape of the MIR-PHI signal is not perfectly spherical, which may be due to a slight misalignment in the optical system. The MIR-PHI signal may be improved by implementing a movable piezo z-axis objective mount, and finer micrometer actuators for positioning.

Figure 5B:
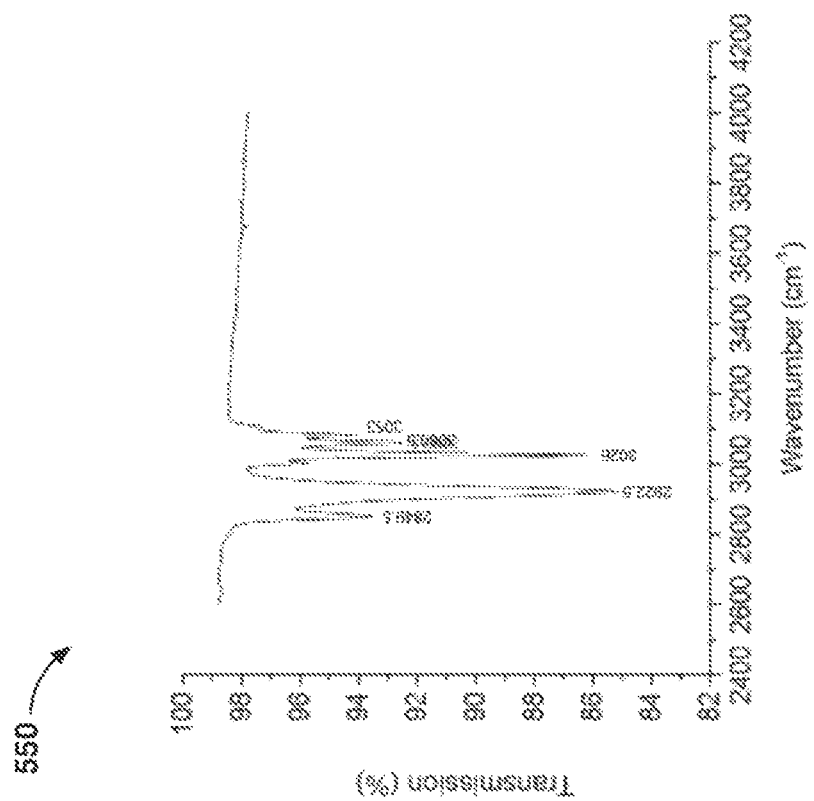
FIG. 5B is an ensemble Fourier transform infrared measurement (FT-IR) the polystyrene bead on a glass coverslip from FIG. 5A.
Figure 5A:
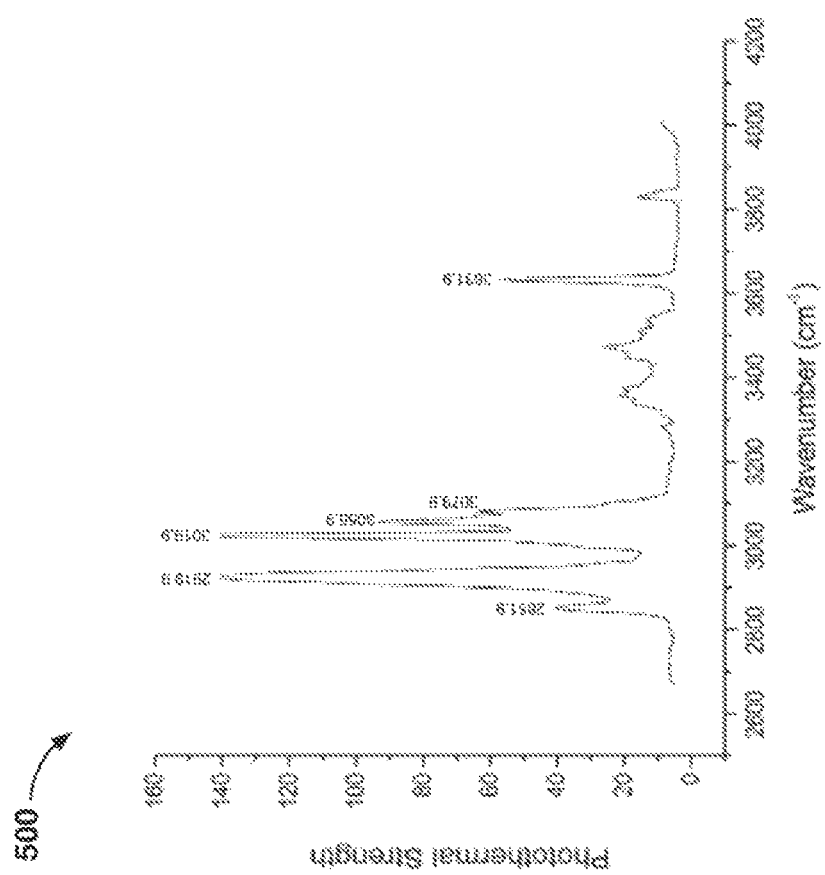
FIG. 5A is a MIR-PHI spectrum graph of a polystyrene bead on a glass coverslip captured by the example photothermal imaging system.

FIG. 5A is a MIR-PHI spectrum graph 500 of a polystyrene bead on a glass coverslip captured by the example photothermal imaging system. When both the pump beam and the probe beam rest on one particle, tuning the pump beam (MIR) can provide local absorption spectral information. The MIR-PHI signal can be measured at a plurality of wavelengths of the pump beam, resulting in a clear MIR absorption spectrum of PS beads as shown in FIG. 5A.

FIG. 5B is an ensemble Fourier transform infrared measurement (FT-IR) 550 the polystyrene bead on a glass coverslip from FIG. 5A. The MIR-PHI spectrum graph 500 of FIG. 5A roughly matches with the ensemble FT-IR measurement of the polystyrene beads sample in FIG. 5B. Slight differences in peak positions are due to the mismatch in scanning spectral step-size (4 cm$^{-1}$ vs 2 cm$^{-1}$).

Although the peaks in FIG. 5A and FIG. 5B are not precisely identical, the two graphs illustrate that a MIR-PHI spectrum can serve to identify the chemical composition of a sample. In this example, the MIR-PHI spectrum peaks in FIG. 5A correspond with spectrum dips in the FT-IR spectrum in FIG. 5B. Given a database of known FT-IR spectra, the MIR-PHI spectrum of some sample may be compared against that database to identify the chemical composition of that sample.

Figures 6A, 6B:
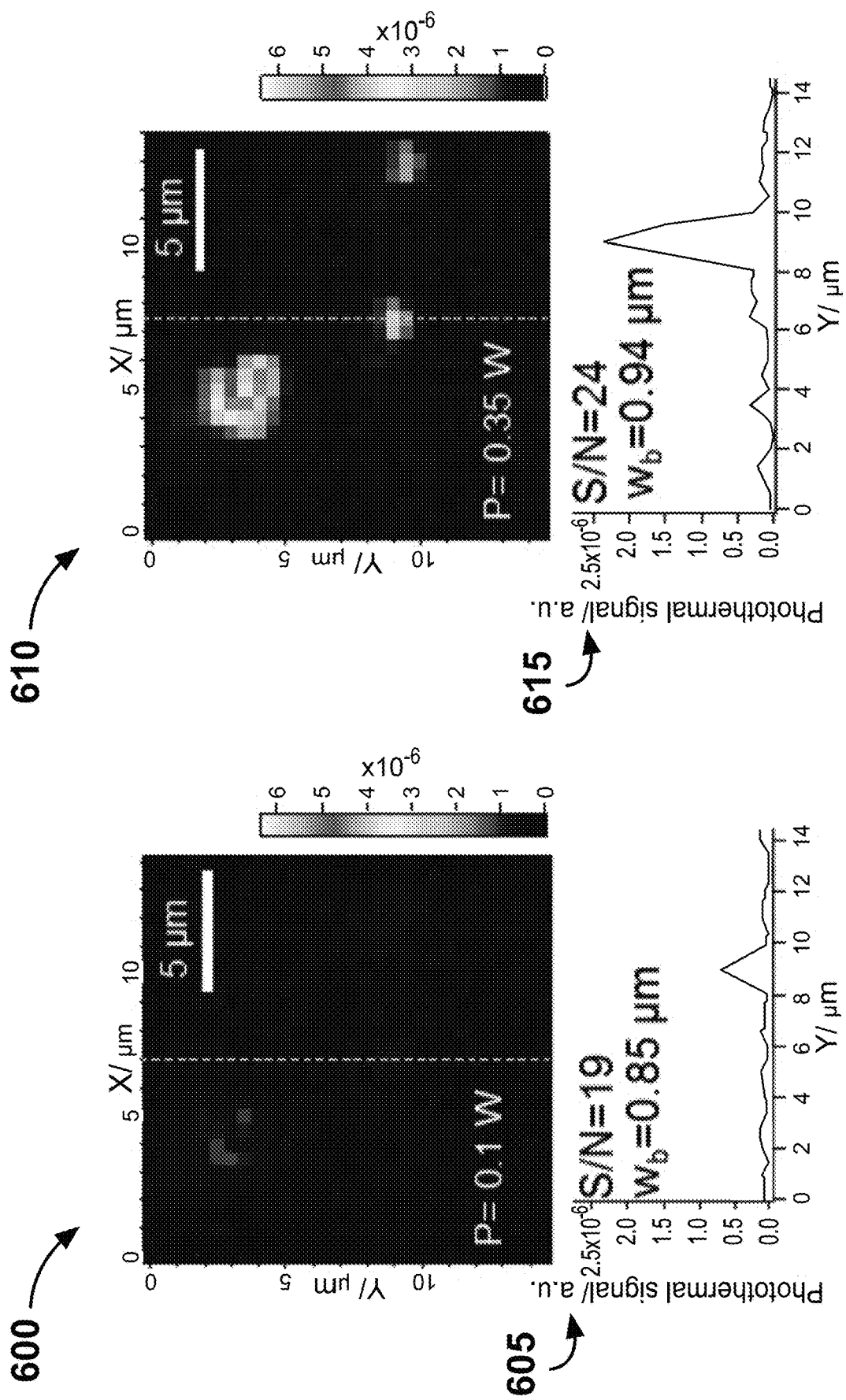
FIG. 6A is a MIR-PHI measurement of a polystyrene bead in carbon disulfide in a first irradiance configuration, captured by the example photothermal imaging system.
FIG. 6B is a MIR-PHI measurement of the polystyrene bead in carbon disulfide in a second irradiance configuration, captured by the example photothermal imaging system.
Figures 6C, 6D:
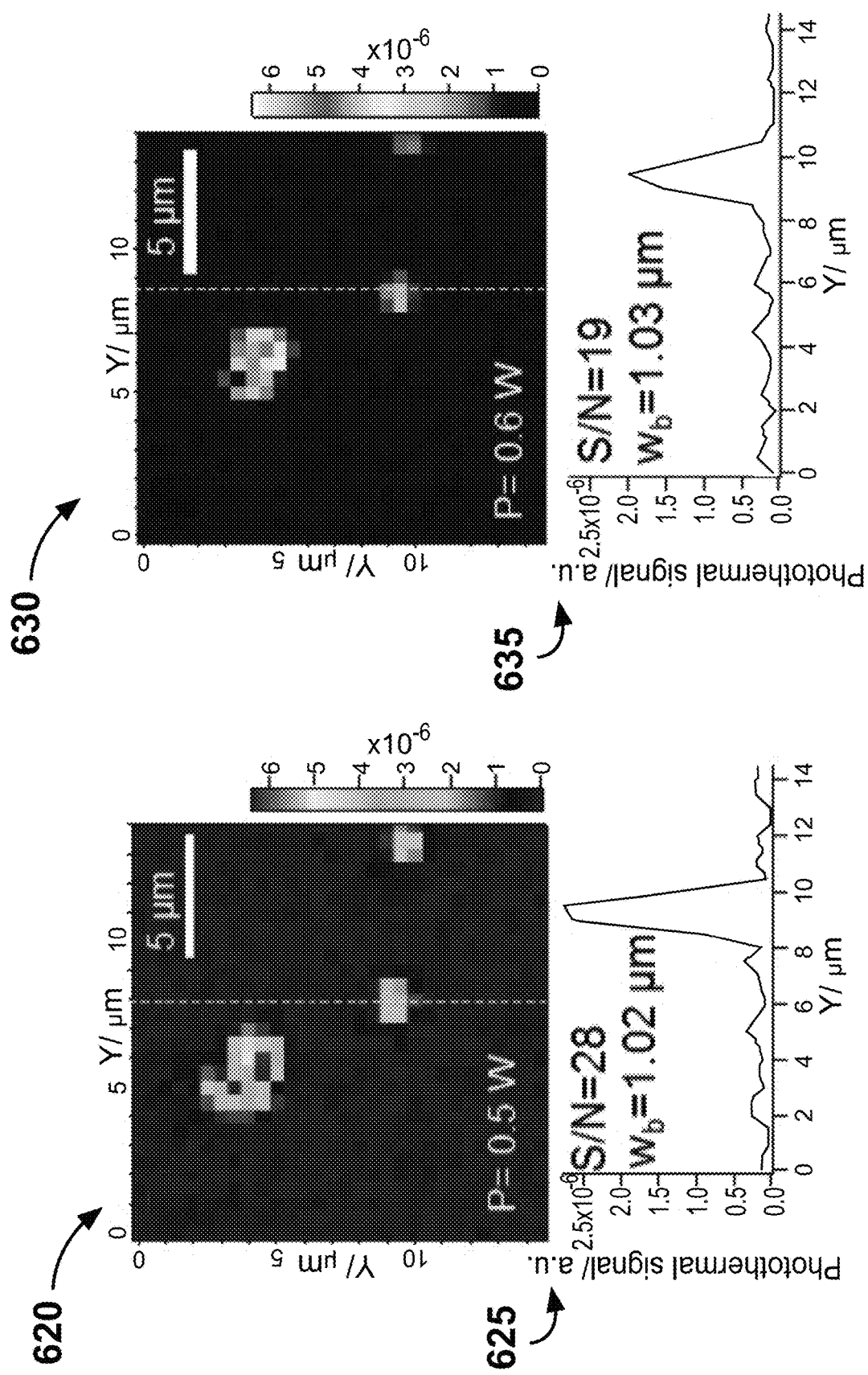
FIG. 6C is a MIR-PHI measurement of the polystyrene bead in carbon disulfide in a third irradiance configuration, captured by the example photothermal imaging system.
FIG. 6D is a MIR-PHI measurement of the polystyrene bead in carbon disulfide in a fourth irradiance configuration, captured by the example photothermal imaging system.

FIGS. 6A-6D are MIR-PHI measurements of a polystyrene bead in carbon disulfide ($CS_2$) at different irradiance configurations, captured by the example photothermal imaging system. In FIG. 6A, image 600 and line-profile graph 605 are MIR-PHI measurements taken with a radiance level of 0.1 Watts, resulting in a Gaussian beam waist of 0.85 µm and a signal-to-noise ratio (SNR) of 19. In FIG. 6B, image 610 and line-profile graph 615 are MIR-PHI measurements taken with a radiance level of 0.35 Watts, resulting in a Gaussian beam waist of 0.94 µm and an SNR of 24. In FIG. 6C, image 620 and line-profile graph 625 are MIR-PHI measurements taken with a radiance level of 0.5 Watts, resulting in a Gaussian beam waist of 1.02 µm and an SNR of 28. In FIG. 6D, image 630 and line-profile graph 635 are MIR-PHI measurements taken with a radiance level of 0.6 Watts, resulting in a Gaussian beam waist of 1.03 µm and an SNR of 19.

FIGS. 6A-6D were produced as a part of a probe irradiance dependence study, which was performed to investigate the optimal probe irradiance levels. An area of 15×15 µm is studied (scanning step size: 0.5 µm), with single 1.1 µm polystyrene beads present in the field of view.

Comparison between FIGS. 6A, 6B, and 6C clearly shows an enhancement of the signal level with an increase in the probe irradiance. However, comparing the results between FIG. 6C and FIG. 6D displays an opposite trend, where a radiance level increase caused a decrease in signal level. Possible sample damage may explain the signal degradation between FIG. 6C and FIG. 6D. In this example, probe irradiance around 0.4 W was determined to be preferred for this system.

The line profiles in the graphs of FIGS. 6A-6D were used to estimate the spatial resolution. The results show that the beam waist is around 1 µm, very similar to the size of the polystyrene beads. On the other hand, the theoretical Abbe diffraction limit of the pump beam is $$\frac{\lambda}{2*NA} = 2.33 \; \mu m.$$

Thus, super-resolution MIR imaging was achieved.

Although some nonpolar media, such as $CS_2$ and $CCl_4$ have excellent photothermal properties and minimum infrared absorption, their low boiling points and poor biocompatibility substantially lessen their potential for applications. Bio-compatible media, such as glycerin and water, are of much greater interest. Hence, it is worthwhile to test the photothermal imaging system with the 1.1 µm polystyrene beads in both glycerin and water.

Figure 7A:
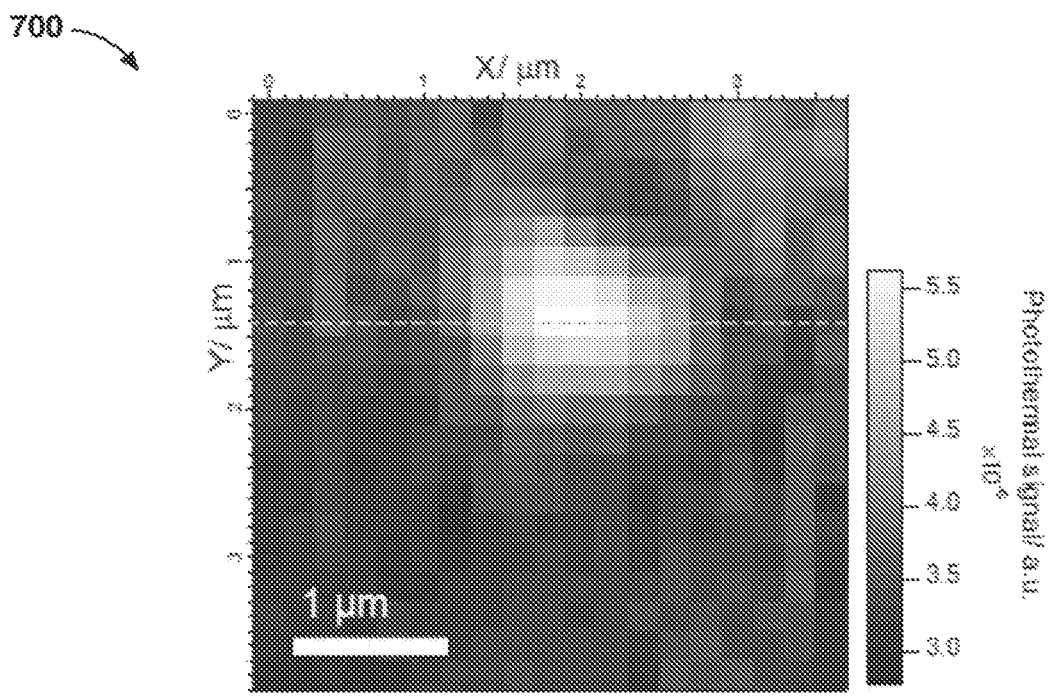
FIG. 7A is a MIR-PHI image of a polystyrene bead in glycerin, captured by the example photothermal imaging system.
Figure 7B:
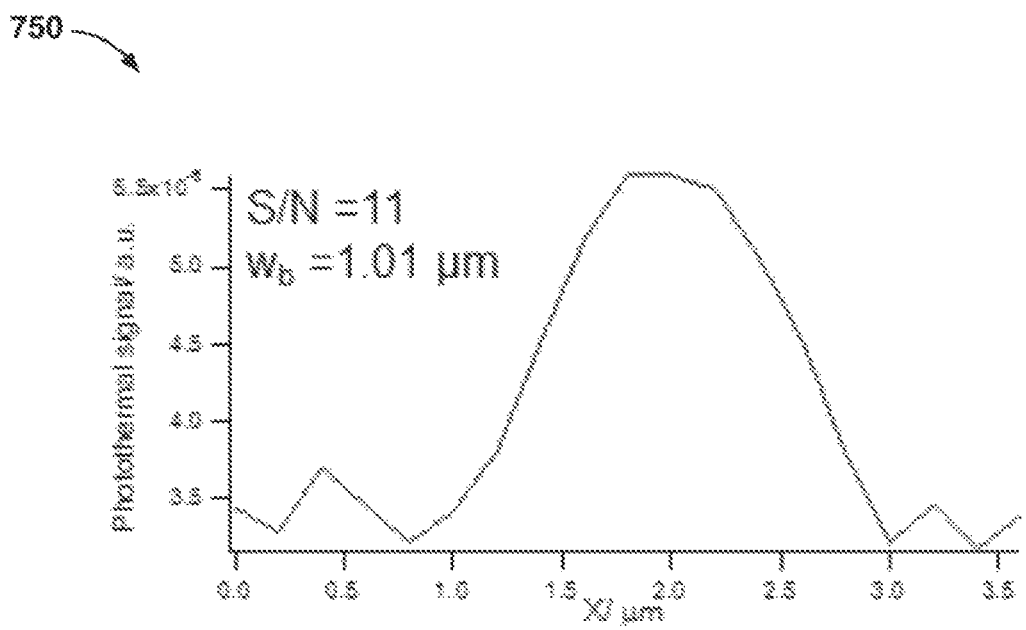
FIG. 7B is a MIR-PHI line-profile graph of a polystyrene bead in glycerin, captured by the example photothermal imaging.

FIG. 7A is a MIR-PHI image 700 of a polystyrene bead in glycerin, captured by the example photothermal imaging system. FIG. 7B is a MIR-PHI line-profile graph 750 of the MIR-PHI image 700 shown in FIG. 7A. Glycerin, although not as ideal as $CS_2$ and $CCl_4$ for a photothermal medium, is still around 5 times better than water for this application. In FIG. 7, a single 1.1 µm polystyrene bead is imaged with much smaller step size (0.2 µm). However, the signal-to-noise ratio falls to the order of 11, which makes this measurement more difficult. The reason for the inferior S/N ratio lies in the fact that the mid-IR absorptions of Glycerin and polystyrene are largely overlapped in this region. Therefore the background signal level for the PHI image is much higher than that from $CS_2$, which in turn gives rise to the deteriorated S/N ratio.

This disadvantage was believed to be even more severe for measurements in water, because of the broad absorption band that water has in the mid-IR region. In order to alleviate this issue, the absorption of the polystyrene and water were carefully compared. The tests and results of the MIR-PHI imaging of polystyrene beads in water is described above in relation to FIGS. 2A and 2B.

In summary, MIR-PHI not only significantly improves the spatial resolution of traditional MIR imaging, but also circumvents the usage of a sophisticated mid-IR detector. It therefore provides a robust super-resolution MIR imaging solution in an inexpensive way. The experimental results show that measurements in $CS_2$ imaged 1.1 µm polystyrene beads at a reasonable S/N ratio, with super-resolution capabilities. Results in glycerin and water, although displaying similar resolution, have much poorer S/N ratios. Hyperspectral imaging will be performed in the near future to exploit the wealth of chemical information in the mid-IR region. Also, fine tuning in the z axis of the imaging plane can be a direction to significantly improve the signal-to-noise ratio. Image post-processing with image fusion or other methods can potentially enhance the imaging contrast too.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

It should be understood that arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed:

1. A method for detecting infrared light absorption in a sample, the method comprising:
   a) illuminating a region of the sample with a pump beam generated by a first light source, wherein at least a portion of the pump beam is absorbed by the region of the sample;

b) illuminating the region of the sample with a probe beam generated by a second light source, wherein the probe beam has a wavelength shorter than the pump beam and a Gaussian beam width of less than 2.33 micrometers;

c) collecting, by a detector, a portion of the probe beam coming from the region of the sample as collected light; and d) analyzing the collected light to construct a signal indicative of infrared absorption by the region of the sample.

2. The method according to claim 1, wherein analyzing the collected light comprises generating, based on the collected light and a wavelength of the first light source, a signal indicative of the portion of the pump beam absorbed by the region of the sample, wherein the signal represents an amount of infrared light absorbed by the region of the sample.

3. The method according to claim 1, further comprising repeating (a)-(d) at a plurality of regions on the sample to construct a map of the signal indicative of infrared absorption with a spatial resolution of less than 1 micron.

4. The method according to claim 1, wherein the probe beam has a Gaussian beam width of less than 0.7 micrometers.

5. The method according to claim 1,
wherein the pump beam travels along a first pathway toward the region of the sample,
wherein the probe beam travels along a second pathway toward the region of the sample, and
wherein the first pathway does not intersect with the second pathway.

6. The method according to claim 1,
wherein the pump beam is directed toward a first sample surface,
wherein the probe beam is directed toward a second sample surface, and
wherein the first sample surface is adjacent to the second sample surface.

7. The method according to claim 1,
wherein the pump beam is directed toward a first sample surface,
wherein the probe beam is directed toward a second sample surface, and
wherein the first sample surface is the same as the second sample surface.

8. The method according to claim 1, further comprising modulating the pump beam according to a first modulation frequency.

9. The method according to claim 8, wherein the first modulation frequency is greater than or equal to 100 kHz.

10. The method according to claim 1, wherein the first light source is a mid-infrared laser having at least one emission wavelength within the range of 3 to 25 micrometers.

11. The method according to claim 1, wherein the second light source is a visible light laser having at least one emission wavelength that is less than or equal to 800 nanometers.

12. The method according to claim 1, further comprising focusing, by a reflective objective, the pump beam onto the region of the sample.

13. The method according to claim 1, further comprising focusing, by a refractive objective, the probe beam onto the region of the sample.

14. The method according to claim 1, wherein the analyzing comprises:
sending a signal from the detector to a lock-in amplifier configured to determine at least one of an amplitude and a phase of the probe beam collected from the region of the sample; and
using the at least one of the amplitude and the phase of the probe beam to construct the signal indicative of infrared absorption by the region of the sample.

15. The method according to claim 1, wherein the sample is held by a cell adapted for high infrared transmission, wherein the cell includes sapphire windows.

16. The method according to claim 1, wherein absorption of infrared radiation from the pump beam by the sample results in a temperature increase of the region of the sample and wherein propagation of the probe beam is affected by a thermal lens formed by the temperature increase.

17. The method according to claim 1, wherein the analyzing comprises sending a signal from the detector to a lock-in amplifier configured to determine at least one modulation property of the collected light.

18. The method of claim 17 wherein the at least one modulation property comprises at least one of frequency, shift in frequency, phase, phase shift, and modulation intensity.

19. The method of claim 18 wherein a determined modulation frequency is used to construct the signal indicative of infrared absorption by the region of the sample.

20. The method of claim 1 where the sample is immersed in a liquid.

21. The method of claim 20 where the liquid comprises water.

22. The method of claim 20 wherein the liquid is chosen to enhance a photothermal detection of IR absorption by the sample.

23. A method for detecting infrared light absorption in a sample, the method comprising:

a) illuminating a region of the sample with a pump beam generated by a tunable source of mid-infrared radiation, wherein at least a portion of the pump beam is absorbed by the region of the sample at least one wavelength generated by the tunable source of mid-infrared radiation;

b) illuminating the region of the sample with a probe beam generated by a second light source, wherein the probe beam has a wavelength shorter than the pump beam and a Gaussian beam width of less than 2.33 micrometers;

c) collecting by a detector at least of a portion of the probe beam coming from the region of the sample;

d) generating, based on a portion of the probe beam collected by the detector, a signal indicative of an amount of infrared light absorbed by the region of the sample; and e) repeating (a)-(d) at a plurality of wavelengths of the tunable source of mid-infrared radiation.

24. The method according to claim 23, further comprising:
generating a signal indicative of an absorption spectrum of the region of the sample; and
based on the signal indicative of the amount of infrared light absorbed by the region of the sample, determining one or more chemical compounds present in the sample.

25. The method of claim 20 wherein the liquid is at least one of the group consisting of carbon disulfide, carbon tetrachloride, chloroform, hexane, decane, ethanol, and glycerin.

26. The method according to claim 23, further comprising:
generating a signal indicative of an absorption spectrum of the region of the sample; and
comparing the signal indicative of the amount of infrared light absorbed by the region of the sample to a database to identify a chemical composition of the sample.

27. The method according to claim 23, wherein the probe beam has a Gaussian beam width of less than 0.7 micrometers.

28. A system for detecting infrared light absorption in a sample, the system comprising:
a first light source operable to illuminate a region of the sample with a pump beam generated by a tunable mid-infrared light source operable to generate radiation at a plurality of wavelengths; and wherein the sample absorbs at least a portion of the pump beam at least one wavelength of a tunable light source;
a second light source operable to illuminate the region of the sample with a probe beam generated by a second light source, wherein the probe beam has a shorter wavelength than that of the pump beam and also has a Gaussian beam width of less than 2.33 micrometers;
a detector operable to collect at least a portion of the probe beam from the region of the sample; and
a signal processing device configured to generate a signal indicative of an amount of mid-infrared light absorbed by the region of the sample with at the plurality of wavelengths of the tunable IR pump beam.

29. The system according to claim 28, wherein the system is further configured to:
generate a signal indicative of an absorption spectrum of the sample based on the signal indicative of the absorption of the region of the sample at the plurality of wavelengths of the tunable IR pump beam; and
based on the signal indicative of the absorption spectrum, determine one or more chemical compounds present in the sample.

30. The system according to claim 28, wherein the probe beam has a Gaussian beam width of less than 0.7 micrometers.

* * * * *